(12) United States Patent
Hummel et al.

(10) Patent No.: US 10,364,688 B2
(45) Date of Patent: Jul. 30, 2019

(54) MINIDISK BALANCE FLANGE

(71) Applicant: United Technologies Corporation, Farmington, CT (US)

(72) Inventors: Raymond S Hummel, South Windsor, CT (US); Steven D Porter, Wethersfield, CT (US); Julian Partyka, Springfield, CT (US)

(73) Assignee: United Technologies Corporation, Farmington, CT (US)

( * ) Notice: Subject to any disclaimer, the term of this patent is extended or adjusted under 35 U.S.C. 154(b) by 375 days.

(21) Appl. No.: 15/343,965

(22) Filed: Nov. 4, 2016

(65) Prior Publication Data

US 2018/0128119 A1 May 10, 2018

(51) Int. Cl.
| | |
|---|---|
| *F01D 9/02* | (2006.01) |
| *G01M 1/38* | (2006.01) |
| *F01D 25/04* | (2006.01) |
| *G01M 1/32* | (2006.01) |
| *F01D 5/02* | (2006.01) |
| *F01D 5/30* | (2006.01) |
| *F04D 29/66* | (2006.01) |
| *G01M 1/36* | (2006.01) |

(52) U.S. Cl.
CPC .............. *F01D 9/02* (2013.01); *F01D 5/027* (2013.01); *F01D 5/3015* (2013.01); *F01D 25/04* (2013.01); *F04D 29/662* (2013.01); *G01M 1/32* (2013.01); *G01M 1/36* (2013.01); *F05B 2260/966* (2013.01); *F05D 2220/32* (2013.01); *F05D 2260/96* (2013.01)

(58) Field of Classification Search
CPC .......... F01D 5/027; F01D 25/04; F01D 25/06; F01D 5/3015; F04D 29/662; F04D 29/668; F05D 2260/96; F05B 2260/96; F05B 2260/966; G01M 1/32; G01M 1/36
USPC ......................................... 416/144, 145, 500
See application file for complete search history.

(56) References Cited

U.S. PATENT DOCUMENTS

| | | | |
|---|---|---|---|
| 4,879,792 A | 11/1989 | O'Connor | |
| 7,309,211 B2* | 12/2007 | Ellis | F01D 5/027 416/144 |
| 2004/0156708 A1* | 8/2004 | Allam | B23P 6/002 415/144 |
| 2015/0096304 A1* | 4/2015 | von der Esch | F01D 5/06 60/796 |

(Continued)

FOREIGN PATENT DOCUMENTS

| | | |
|---|---|---|
| EP | 1380759 | 1/2004 |
| EP | 1445422 | 8/2004 |
| EP | 1795702 | 6/2007 |

(Continued)

OTHER PUBLICATIONS

European Patent Office, European Search Report dated May 25, 2018 in Application No. 17195673.3-1006.

*Primary Examiner* — Christopher Verdier
(74) *Attorney, Agent, or Firm* — Snell & Wilmer, L.L.P.

(57) ABSTRACT

A minidisk for a rotor system may comprise a balance flange defining a hole array, which may include a first hole having a first width. The first hole may be configured to receive a balance weight. A second hole and a third hole may have a second width. The second hole and the third hole may be disposed adjacent to the first hole. The second width may be greater than the first width.

18 Claims, 8 Drawing Sheets

(56) References Cited

U.S. PATENT DOCUMENTS

2017/0108009 A1* 4/2017 Obereich ................ F01D 5/027

FOREIGN PATENT DOCUMENTS

| EP | 3156590 | 4/2017 |
|----|---------|--------|
| GB | 2421582 | 6/2006 |

* cited by examiner

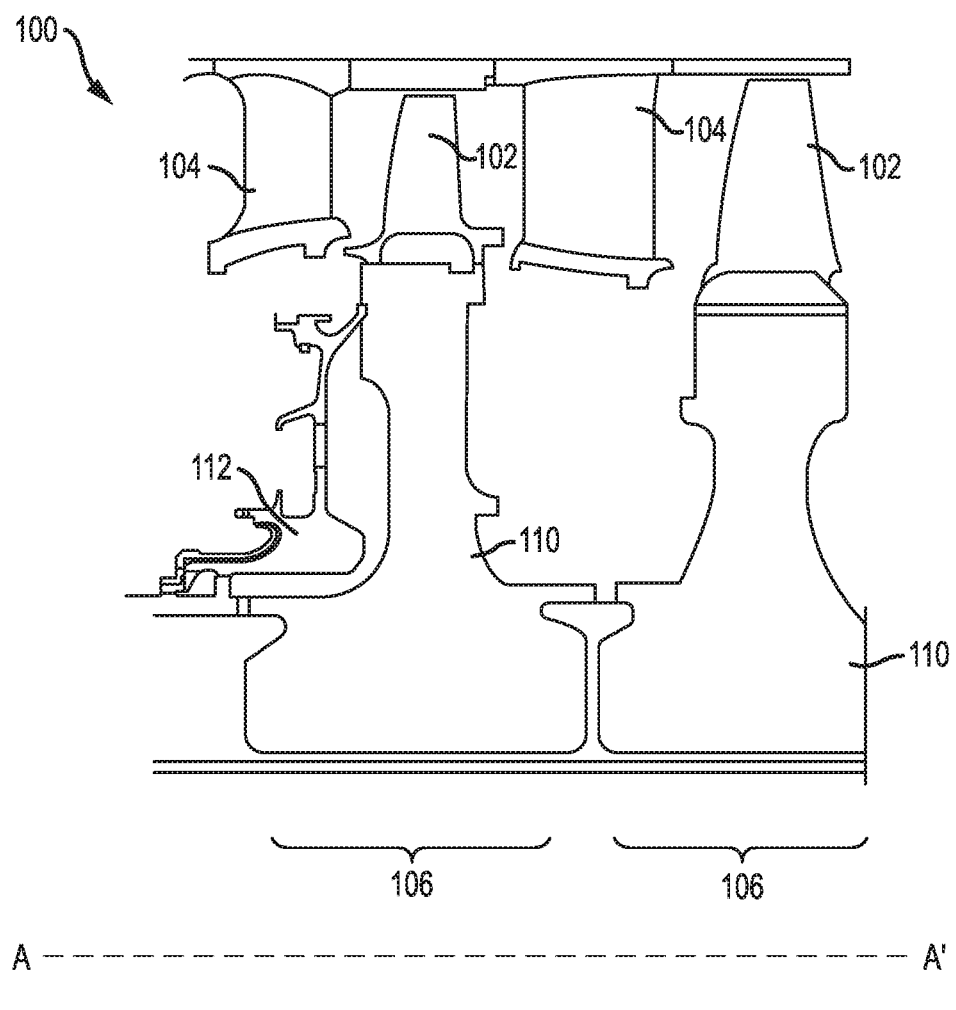
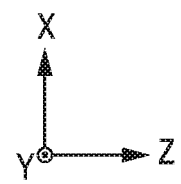
FIG.2A

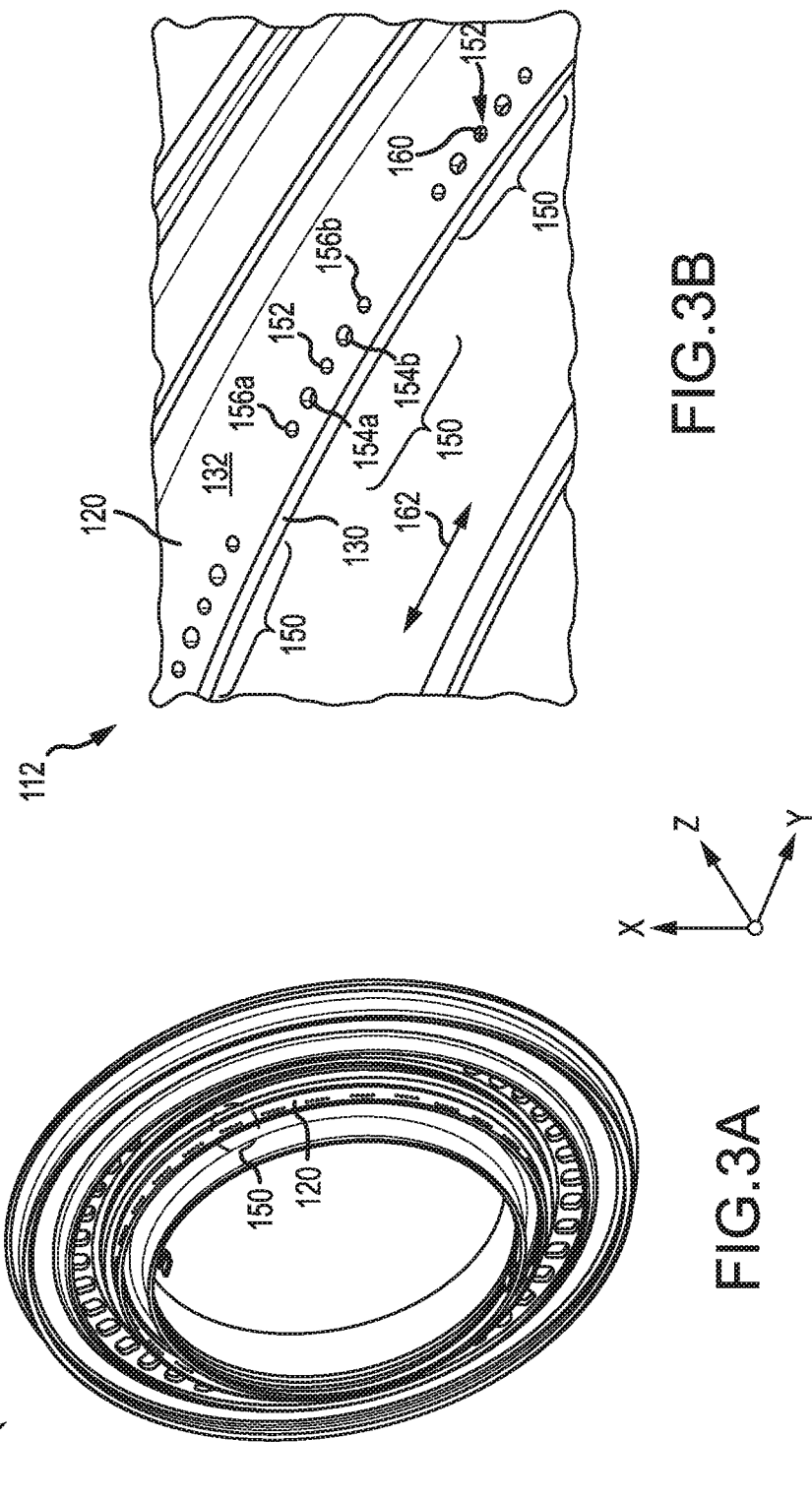

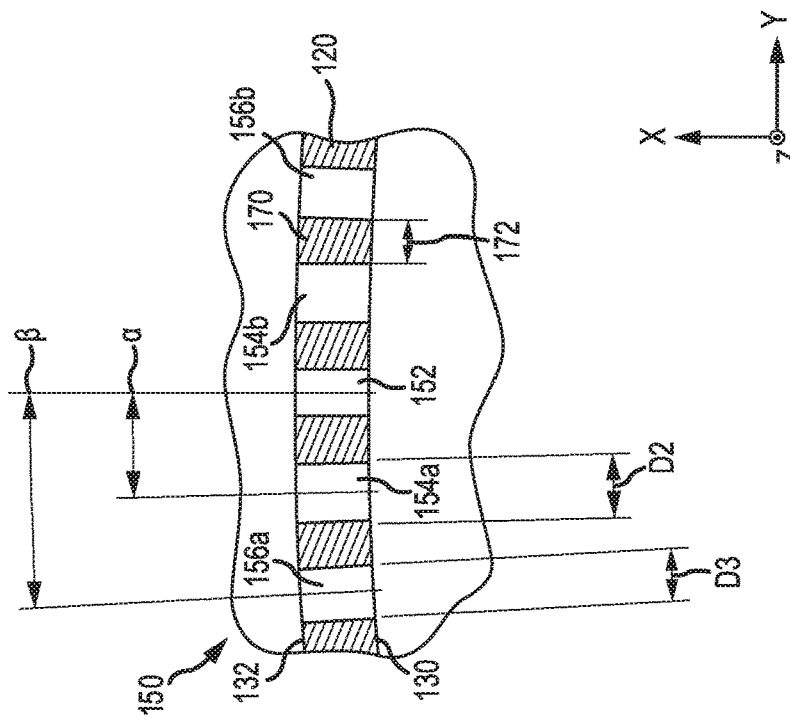
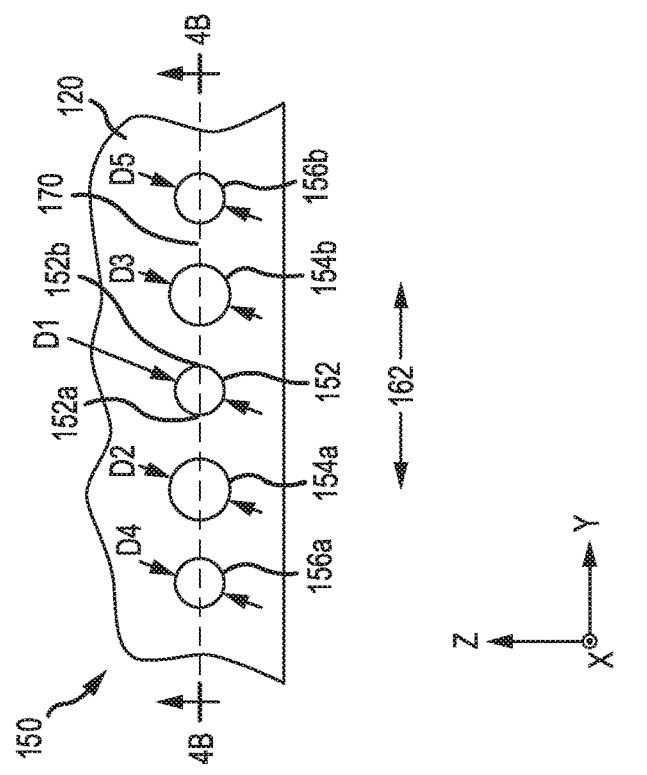
FIG. 4B
FIG. 4A

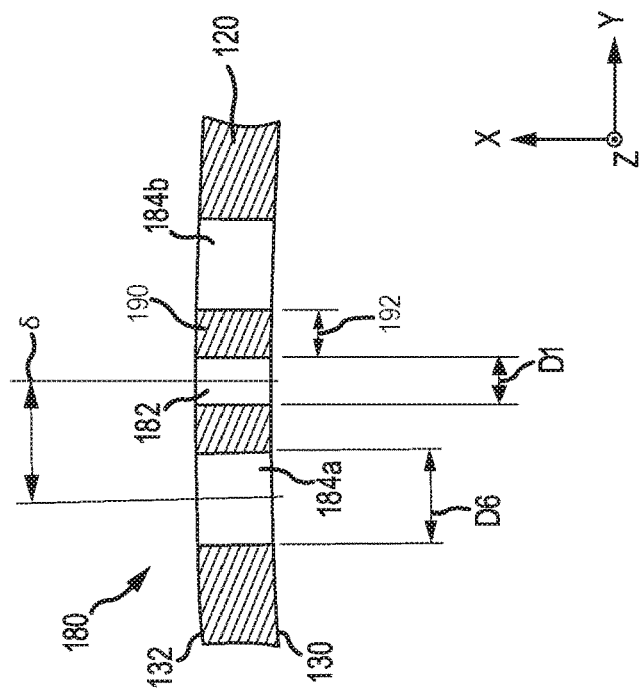
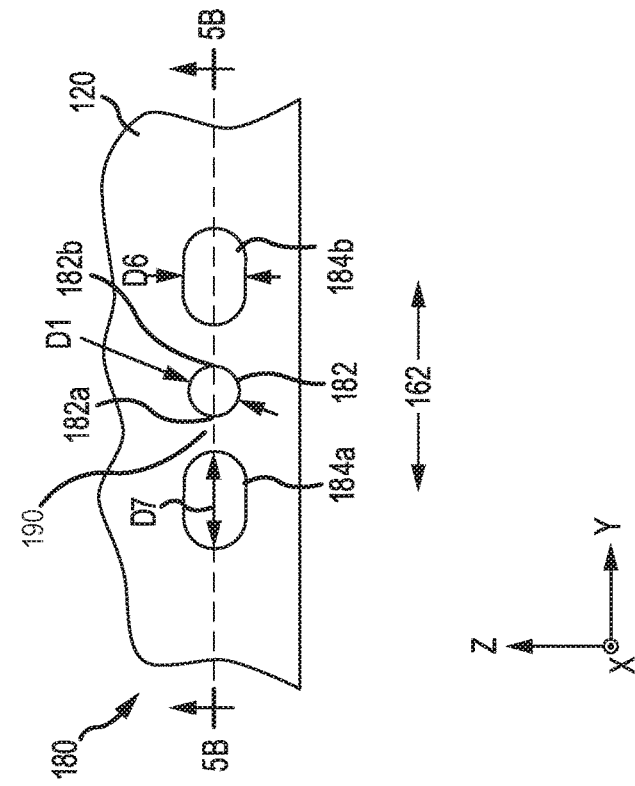

MINIDISK BALANCE FLANGE

FIELD

The present disclosure relates to gas turbine engines and, more specifically, to systems for balancing rotating components of gas turbine engines.

BACKGROUND

Gas turbine engines typically include a compressor section, a combustor section, and a turbine section. During operation, air is pressurized in the compressor section. The pressurized air is mixed with fuel and burned in the combustor section to generate hot combustion gases. The hot combustion gases are communicated through the turbine section, which extracts energy from the hot combustion gases to power the compressor section and other gas turbine engine loads. The compressor section typically includes low pressure and high pressure compressors, and the turbine section includes low pressure and high pressure turbines.

The compressor and turbine sections of a gas turbine engine typically include alternating rows of rotating blades and stationary vanes. Turbine and compressor rotors may include a rotor disk and a plurality of circumferentially spaced turbine blades. For instance, the high pressure turbine section may include one or more turbine disks coupled together to form a disk stack. Because the disk stack rotates within the engine at high speeds, the disk stack may be rotationally balanced to reduce vibration. At least one disk in the disk stack may include a cover plate to which one or more balance weights is coupled, thereby balancing the disk stack. Disks and cover plates may be subject to high radial forces. The balancing weights may introduce stress concentrations in the cover plate.

SUMMARY

A system for balancing rotor assemblies and reducing stress in the balancing systems is described herein, in accordance with various embodiments. A minidisk for a rotor system may comprise a balance flange defining a hole array, which may include a first hole having a first width. The first hole may be configured to receive a balance weight. A second hole and a third hole may have a second width. The second hole and the third hole may be disposed adjacent to the first hole. The second width may be greater than the first width.

In various embodiments, the first hole, the second hole and the third hole may be arranged linearly along a circumference of the minidisk. The first hole may be disposed between the second hole and the third hole. The second width may be between 1.1 and 1.3 times the first width. A distance between the first hole and the second hole may be between 0.5 to 1.5 times at least one of the first width or the second width. The hole array may further comprise a fourth hole having a fourth width. The fourth hole may be disposed adjacent to the second hole and opposite to the first hole. The fourth width may be the same as the first width. The hole array may further comprise a fifth hole having a fifth width. The fifth hole may be disposed adjacent to the third hole and opposite to the first hole. The fifth width may be the same as the first width. The first hole, the second hole, the third hole, the fourth hole and the fifth hole may each have a circular shape. The minidisk may further comprise a plurality of hole arrays disposed around a circumference of the balance flange.

A gas turbine engine is also provided. The gas turbine engine may comprise a turbine section including a rotor assembly. The rotor assembly may comprise a disk and a minidisk coupled to the disk. The minidisk may have a balance flange defining a hole array. The hole array may comprise a first hole having a first width. The first hole may be configured to receive a balance weight. A second hole may be disposed adjacent to the first hole and may have a second width. The second width may be greater than the first width. A third hole may be disposed adjacent to the first hole and may have a third width, which may be the same as the second width. The first hole may be disposed between the second hole and the third hole.

In various embodiments, the first hole, the second hole and the third hole may be arranged linearly along a circumference of the minidisk. The balance flange extends axially from the minidisk and the first hole extends radially through the balance flange. The second width may be between 1.1 and 1.3 times the first width. A distance between the first hole and the second hole may be between 0.5 to 1.5 times at least one of the first width or the second width.

The minidisk may further comprise a fourth hole disposed adjacent to the second hole and having a fourth width, which may the same as the first width. The minidisk may further comprise a fifth hole having a fifth width, which may be the same as the first width. The third hole may be disposed between the first hole and the fifth hole. The first hole, the second hole, the third hole, the fourth hole and the fifth hole may each have a circular shape. At least one of the fourth hole or the fifth hole may be configured to receive a balance weight. The minidisk may further comprise a plurality of hole arrays disposed around a circumference of the balance flange.

A minidisk for a rotor system may comprise a balance flange defining a hole array. The hole array may include a first hole having a first width. The first hole may be configured to receive a balance weight. A second hole and a third hole may have a second width. The second hole and the third hole may be disposed adjacent to the first hole. The second width may be greater than the first width. The hole array may include a fourth hole and a fifth hole having the same width as the first width. The second hole may be disposed between the first hole and the fourth hole, and the third hole may be disposed between the first hole and the fifth hole.

In various embodiments, a distance between the first hole and the second hole may be between 0.5 to 1.5 times at least one of the first width or the second width. At least one of the third hole or the fifth hole may be configured to receive the balance weight. The first hole, the second hole, the third hole, the fourth hole and the fifth hole may each have a circular shape.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

FIGS. 2A and 2B illustrates a partial cross-sectional view of a rotor assembly of a gas turbine engine including balance flange, in accordance with various embodiments;

FIGS. 3A and 3B illustrate a perspective view of a minidisk including a balance flange having a plurality of hole arrays, in accordance with various embodiments;

FIGS. 4A and 4B illustrate a radial view and a cross sectional view of a hole array for a balance flange, in accordance with various embodiments;

FIGS. 5A and 5B illustrate a radial view and a cross sectional view of a hole array for a balance flange, in accordance with various embodiments.

DETAILED DESCRIPTION

Figure 1:
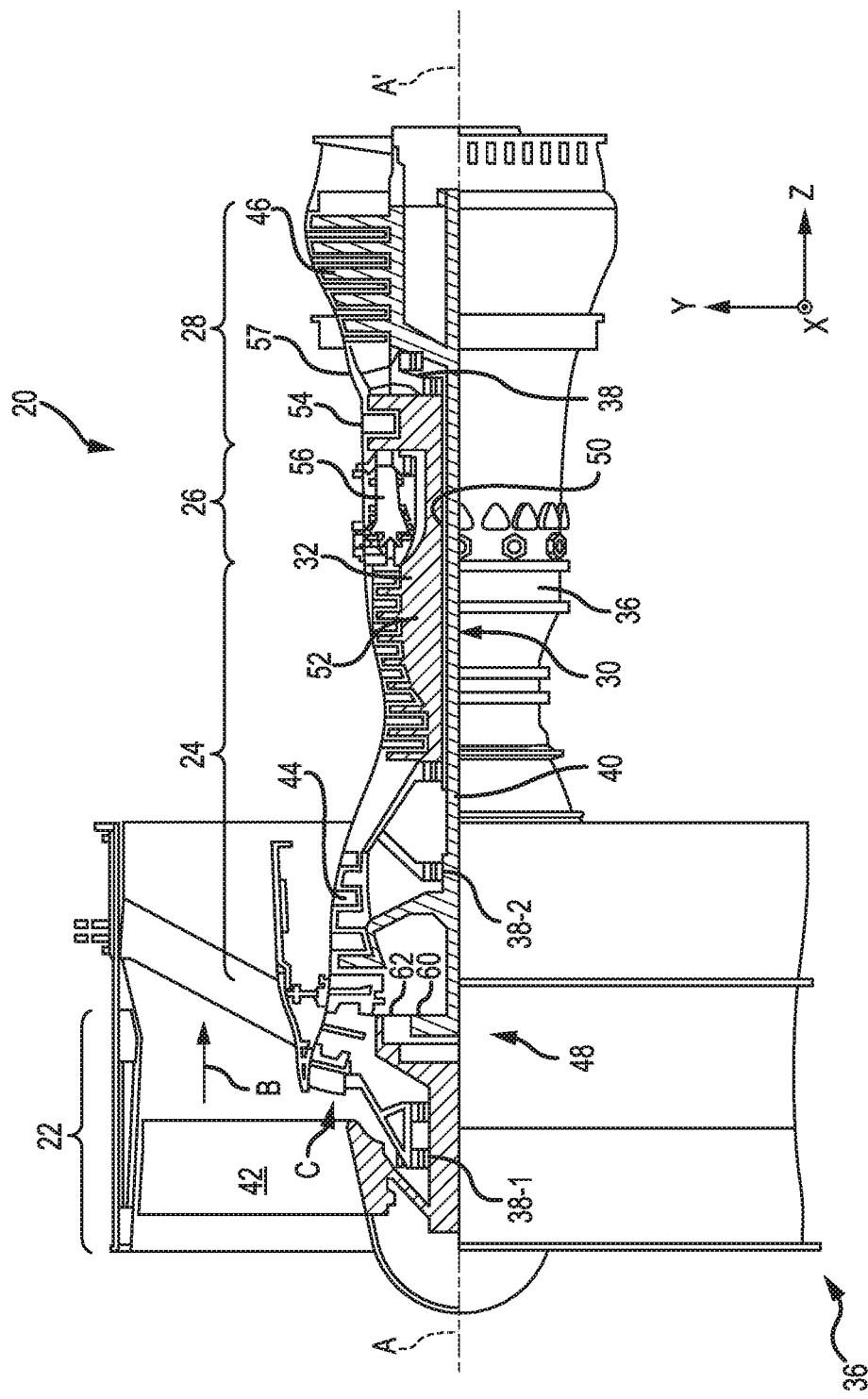
- FIG. 1 illustrates a cross-sectional view of an exemplary gas turbine engine, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

As used herein, "radially outward" refers to the direction generally away from the axis of rotation of a turbine engine. As used herein, "radially inward" refers to the direction generally towards the axis of rotation of a turbine engine.

The present disclosure relates to devices and systems for balancing rotating assemblies, such as high pressure turbine disks or disk stacks, of gas turbine engines. Rotating assemblies comprising cover plates or minidisks configured to receive weighted inserts are provided herein. Rotating assemblies may experience rotational imbalance, which may be corrected by selectively placing balancing weights around the minidisk. The minidisk may experience hoop stress, i.e., a stress due to a mechanical load exerted in the circumferential direction. Hoop stress may be greater at the locations of the balancing weights. An array of openings or holes may be formed in a flange of the minidisk, with a first subset of the holes configured to receive balancing weights and a second subset of the holes configured to reduce the stress concentration experienced by the first subset of holes. Accordingly, the disclosed rotor assembly may be configured to reduce stress concentrations at the locations of the balancing weights.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow path B while compressor section 24 can drive coolant along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flow path C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, low pressure compressor 44, high pressure compressor 52, low pressure turbine 46, and high pressure turbine 54 may comprise one or more stages or sets of rotating blades and one or more stages or sets of stationary vanes axially interspersed with the associated blade stages but non-rotating about engine central longitudinal axis A-A'. The compressor and turbine sections 24, 28 may be referred to as rotor systems. Within the rotor systems of gas turbine engine 20 are multiple rotor disks, which may include one or more cover plates or minidisks. Minidisks may be configured to receive balancing weights or inserts for balancing the rotor systems.

With reference now to FIG. 2A and still to FIG. 1, a portion of an engine section 100 is shown, in accordance with various embodiments. Engine section 100 may be a compressor section 24 or a turbine section 28 or other rotor system. In various embodiments, engine section 100 may be a high pressure turbine 54 of gas turbine engine 20. Engine section 100 is illustrated in FIG. 2A, for example, as a turbine section, and more specifically as a high pressure turbine. It will be understood that the minidisk assemblies in the present disclosure are not limited to the turbine section, and could extend to other sections of the gas turbine engine 20, including but not limited to compressor section 24.

Figure 2B:
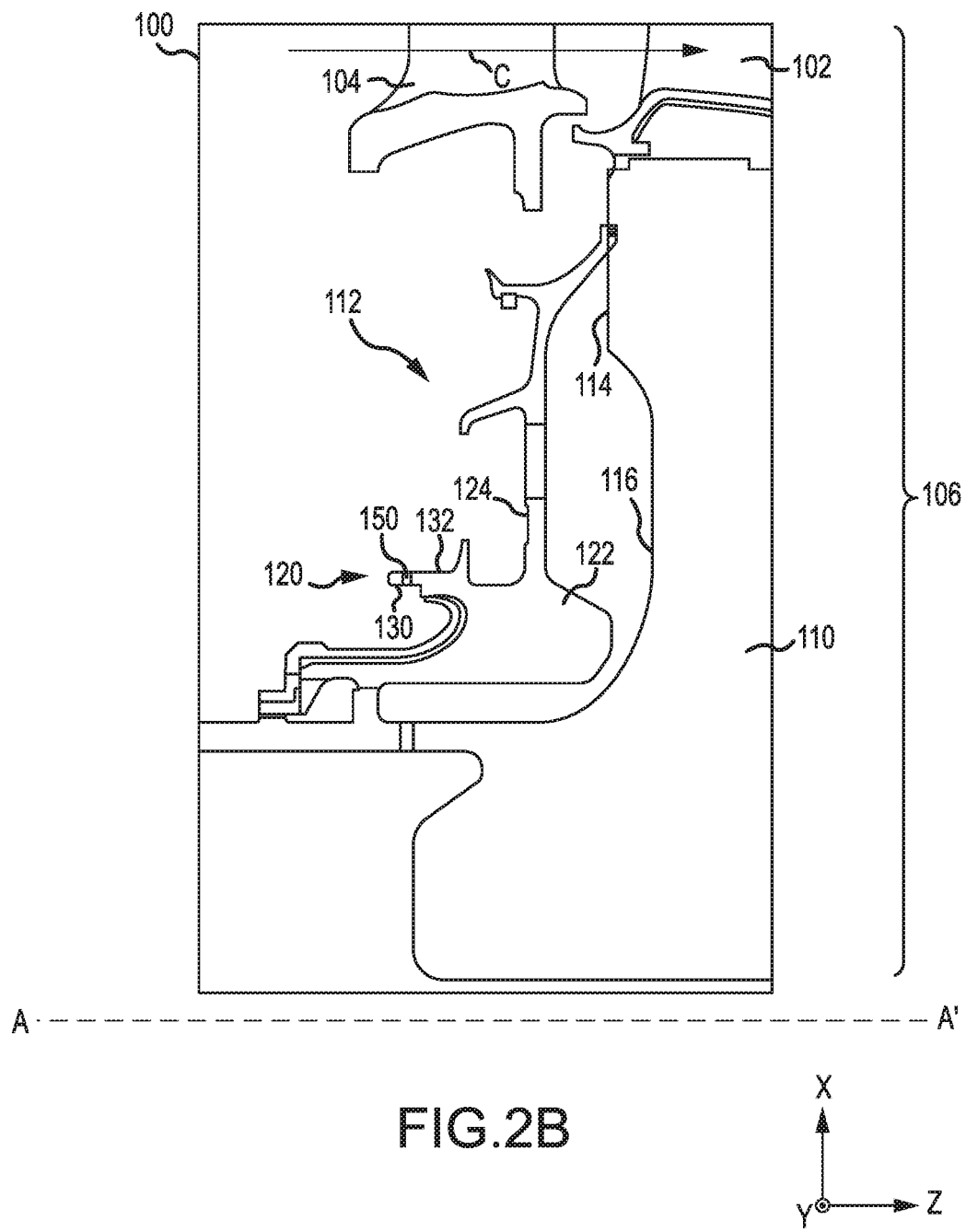

Referring to FIGS. 2A and 2B, engine section 100 may include alternating rows of blades 102 and vanes 104 comprising airfoils that extend into the core flow path C. Vanes 104 may be arranged circumferentially about engine central longitudinal axis A-A'. Blades 102 may rotate about engine central longitudinal axis A-A', while vanes 104 may remain stationary about engine central longitudinal axis A-A', which is parallel to the z-direction on the provided xyz axis. Vanes 104 direct the core airflow to blades 102 to either add or extract energy. Blades 102 create or extract energy from the core airflow that is communicated through engine section 100 along the core flow path C. In various embodiments, a set of blades 102 may be coupled about a circumference of a generally circular disk 110, which may be disposed radially inward of core flow path C. Disk 110 may be configured to rotate about engine central longitudinal axis A-A'. Disk 110 and blade 102 may comprise a rotor assembly 106 of engine section 100. Engine section 100 may include a plurality of rotor assemblies 106 with one or more of the rotor assemblies 106 further including one or more cover plates or minidisks 112 coupled to a disk 110.

In various embodiments, a cover plate or minidisk 112 may be coupled to an axial surface 114 of disk 110. Minidisk 112 may fit at least partially within a channel 116 defined in axial surface 114 of disk 110. Axial surface 114 is illustrated as a forward surface of disk 110. In various embodiments, a minidisk 112 may similarly be coupled to an aft surface of disk 110. Minidisk 112 may be axially and circumferentially retained to the disk 110. Minidisk 112 may be configured to rotate with disk 110 about engine central longitudinal axis A-A'.

Minidisk 112 may include a balance flange 120 extending axially away from a bore or body 122 of minidisk 112. Balance flange 120 may protrude axially forward from a surface 124 of minidisk 112. Balance flange 120 is illustrated protruding from a forward surface of minidisk 112. In various embodiments, balance flange 120 may extend axially away and/or radially outward from body 122 of minidisk 112. Balance flange 120 is illustrated protruding from a forward surface minidisk 112. Balance flange 120 may extend circumferentially around minidisk 112. Balance flange 120 may be used for balancing the rotor assemblies 106 of engine section 100.

Balance flange 120 may define a plurality of hole arrays 150, which may be arranged as groupings of holes formed through balance flange 120. The hole arrays 150 are illustrated in FIG. 2B as a cross-section of a single hole of a hole array 150, the hole having a centerline extending radially from a first surface 130 to a second surface 132 of balance flange 120. First surface 130 may be a radially inner surface of balance flange 120, and second surface 132 may be a radially outer surface of balance flange 120. First surface 130 and second surface 132 may be opposing surfaces of balance flange 120, and depending on the configuration of balance flange 120, may be axial surfaces, such as forward and aft surfaces.

With reference to FIG. 3A, a minidisk 112 is shown, in accordance with various embodiments. Minidisk 112 may have a generally annular shape with balance flange 120 also having an annular shape. Balance flange 120 may define a plurality of hole arrays 150 formed radially through balance flange 120. The holes of hole arrays 150 may be arranged linearly along a circumference of balance flange 120 of minidisk 112. Hole arrays 150 may be spaced equidistant around a circumference of balance flange 120. The quantity of hole arrays 150 in minidisk 112 may be selected according to a diameter of minidisk 112 and in consideration of manufacturing time and cost. Similarly, a distance between hole arrays 150 may depend on the quantity of hole arrays 150 and the diameter of minidisk 112.

Each of the hole arrays 150 may be configured to receive one or more balancing weights. Balancing weights may be selectively inserted into an individual hole of a hole array 150 in order to redistribute the weight of the minidisk 112 to rotationally balance minidisk 112, thereby rotationally balancing disk 110 (of FIGS. 2A-2B) to which minidisk 112 is coupled. The plurality of circumferentially distributed hole arrays 150 provides multiple locations for the placement of balancing weights around minidisk 112.

With reference to FIG. 3B, a portion of a minidisk 112 with a plurality of hole arrays 150 is shown, in accordance with various embodiments. Each of the plurality of hole arrays 150 may include a plurality of holes arranged in a linear pattern oriented in the circumferential direction along balance flange 120. In various embodiments, a hole array 150 may comprise at least five (5) holes, or may comprise at least three (3) holes. A circumferential distance between immediately adjacent hole arrays 150 is substantially greater than a distance between holes within a hole array 150. In various embodiments, between ten (10) and forty (40) hole arrays 150, with each of the hole arrays 150 including at least three (3) holes or at least five (5) holes, may be spaced equidistantly around a circumference of balance flange 120, or between twenty (20) and thirty-five (35) hole arrays 150, or between 25 and 35 hole arrays 150. A hole array 150 may include a first hole 152, which may be centrally located with respect to the hole array 150 and which may be configured to receive a balance weight or insert 160. A size of first hole 152 may be selected according to the dimensions of a balance weight 160. Balance weight 160 is illustrated schematically in FIG. 3B and may include a rivet, plug, fastener or other weight or combination thereof. A hole containing a balance weight 160, such as first hole 152, may produce undesirable stress concentrations in balance flange 120 if the hole is not shielded from hoop stress, i.e., force in the circumferential direction 162 with respect to balance flange 120.

A hole array 150 may include at least two holes 154a, 154b disposed adjacent to the first hole 152, and at least two holes 156a, 156b disposed adjacent to holes 154a, 154b. In various embodiments, a plurality of hole arrays 150, each including holes 152, 154a, 154b, 156a, 156b, may be spaced equally around balance flange 120. A hole array 150 may be arranged with a first hole 152 flanked by a second hole 154a and a third hole 154b, with second hole 154a and third hole 154b disposed on opposing sides of first hole 152. A first circumferential distance between immediately adjacent hole arrays 150 may be greater than a second circumferential distance between the first hole 152 and the second hole 154a. Hole array 150 may be further arranged with a fourth hole 156a disposed adjacent to second hole 154a and opposite to first hole 152, and with a fifth hole 156b disposed adjacent to third hole 154b and opposite to first hole 152. Stated differently, second hole 154a may be positioned between first hole 152 and fourth hole 156a. Third hole 154b may be positioned between first hole 152 and fifth hole 156b.

In relation to the linear pattern of hole array 150, first hole 152 may be arranged as a central hole, second hole 154a and third hole 154b may be arranged as intermediate holes, and fourth hole 156a and fifth hole 156b may be arranged as the outermost holes. Fourth hole 156a and fifth hole 156b may also be configured to receive a balance weight 160. Second hole 154a and third hole 154b may operate to shield stress for first hole 152, fourth hole 156a and fifth hole 156b. Second hole 154a and fourth hole 156a may shield first hole 152 from stress in a first circumferential direction. Third hole 154b and fifth hole 156b may shield first hole 152 from stress in a second circumferential direction, which is 180 degrees opposite to the first circumferential direction. In various embodiments, fourth hole 156a and fifth hole 156b may be substantially the same size as first hole 152. Second hole 154a and third hole 154b may be larger in size than first hole 152, fourth hole 156a and fifth hole 156b. In various embodiments, the second hole 154a and third hole 154b may be between 1.1 and 1.3 times the size of the first hole 152. The larger holes may be disposed in an alternating pattern with the smaller holes. An alternating pattern of small and large holes may provide a better distribution of stress across hole array 150 as compared to, for example, an array of uniformly sized holes. The arrangement of larger holes, second hole 154a and third hole 154b, positioned directly adjacent to first hole 152 may provide greater shielding of first hole 152 from hoop stress as compared to, for example, the directly adjacent holes being similarly sized to first hole 152.

With reference to FIG. 4A, a hole array 150 in a balance flange 120 is shown, in accordance with various embodiments. Describing the arrangement of hole array 150 in relation to the provided xyz axis, the five (5) holes of hole array 150 may be arranged as follows in the positive y-direction: fourth hole 156a, second hole 154a, first hole 152, third hole 154b, fifth hole 156b. In various embodiments, hole arrays 150 may include not more than two hole sizes in order to simplify the manufacturing process for hole arrays 150. Hole arrays 150 may be manufactured by subtractive techniques, drilling, milling, machining or other suitable process. Each of holes 152, 154a, 154b, 156a and 156b may have a round or circular shape. Although depicted as having circular geometry, holes 152, 154a, 154b, 156a and 156b may have an oval, rectangular, slotted, triangular, polygonal, irregular or other shape. While first hole 152 may be round in shape, first hole 152 may also be described in relation to a circumferential direction 162 as having a first side 152a and a second side 152b, wherein circumferential direction 162 is relative to a circumference of balance flange 120. A hole array 150 may be arranged with second hole 154a and fourth hole 156a disposed on a first side 152a of first hole 152 and with third hole 154b and fifth hole 156b disposed on a second side 152b of first hole 152, wherein first side 152a and second side 152b are opposing sides of first hole 152. A hole having circular geometry is understood to have a constant width. As used herein with respect to a circular shape, "width" may refer to the diameter of a circular hole. As used herein with respect to a non-circular shape, "width" may refer to a dimension other than diameter.

A diameter or width D1 of first hole 152 may be selected according to the size of minidisk 112, balance flange 120 and/or balance weight 160. A diameter or width D4 of fourth hole 156a and a diameter or width D5 of fifth hole 156b may be substantially the same as width D1 of first hole 152. A diameter or width D3 of third hole 154b may be substantially the same as a diameter or width D2 of second hole 154a. Width D2 of second hole 154a and width D3 of third hole 154b may be greater than width D1 of first hole 152. In various embodiments, width D2 and width D3 are between 1.1 and 1.3 times the width D1 of first hole 152, and width D4 and width D5 are substantially the same size as width D1. Second hole 154a and third hole 154b may be between 1.1 and 1.3 times the size of at least one of first hole 152, fourth hole 156a or fifth hole 156b. In various embodiments, width D2 and width D3 are 1.1 to 1.3 times at least one of width D1, width D4 or width D5.

In various embodiments, the width D1 of first hole 152, the width D4 of fourth hole 156a and the width D5 of fifth hole 156b may each be nominally between 1.63 millimeters (mm) (0.064 inch) and 1.73 mm (0.068 inch). For example, widths D1, D4, D5 may range from about 1.57 mm (0.062 inch) to 1.78 mm (0.070 inch), or may range from about 1.6 mm (0.063 inch) to 1.75 mm (0.069 inch), or more specifically, may range from about 1.63 mm (0.064 inch) to 1.73 mm (0.068 inch), wherein "about" in this context only means +/−0.01 mm (0.0004 inch).

In various embodiments, the width D2 of second hole 154a and the width D3 of third hole 154b may be nominally between 1.98 mm (0.078 inch) and 2.08 mm (0.082 inch). For example, widths D2, D3 may range from about 1.93 mm (0.076 inch) to 2.13 mm (0.084 inch), or may range from about 1.96 mm (0.077 inch) to 2.1 mm (0.083 inch), or more specifically, may range from about 1.98 mm (0.078 inch) to 2.08 mm (0.082 inch), wherein "about" in this context only means +/−0.01 mm (0.0004 inch).

The portions of balance flange 120 disposed between the holes in a hole array 150 may be described as a web 170, and the distance between holes within a hole array 150 may be described as a web distance 172 (see FIG. 4B). Within a hole array 150, a distance between each hole relative to the size of the hole may be described as a ratio of web distance 172 to the diameter of a hole. For example, a web distance to diameter (or width) ratio may be between 0.5:1 and 1.5:1. Stated differently, a web distance 172 between the first hole 152 and the second hole 154a is between 0.5 to 1.5 times at least one of the width D1 of the first hole 152 or the width D2 of second hole 154a. Similarly, a web distance 172 between the second hole 154a and the fourth hole 156a is between 0.5 to 1.5 times at least one of the width D2 of second hole 154a or the width D3 of fourth hole 156a.

With reference to FIG. 4B, a circumferential cross-sectional view taken along line 4B-4B of FIG. 4A of a hole array 150 in a balance flange 120 is shown, in accordance with various embodiments. In various embodiments, an angle α of a centerline of second hole 154a relative to a centerline of first hole 152 may be about 1.5 degrees, wherein angle α is the angular separation relative to engine central longitudinal axis A-A', wherein "about" in this context only means +/−0.5 degrees. Third hole 154b may be similarly spaced from first hole 152 by angle α in a direction opposite to second hole 154a. An angle β of a centerline of fourth hole 156a relative to a centerline of first hole 152 may be about 3 degrees, wherein "about" in this context only means +/−0.5 degrees. Fifth hole 156b may be similarly spaced from first hole 152 by angle β in a direction opposite to fourth hole 156a. A centerline of the first hole 152 may extend radially through the balance flange 120.

With reference to FIG. 5A, a hole array 180 in a balance flange 120 is shown, in accordance with various embodiments. Similar to hole arrays 150 from FIG. 3B, a plurality of hole arrays 180 in FIG. 5A may be spaced around the circumference of balance flange 120. In various embodiments, a hole array 180 may comprise at least three (3) holes. A first hole 182 of hole array 180 may be centrally located with respect to the hole array 180 and may be configured to receive a balance weight. A size of first hole 182 may be selected according to the dimensions of a balance weight (illustrated schematically in FIG. 3B). Hole array 180 may further include at least two holes 184a, 184b disposed adjacent to the first hole 182. Hole array 180 may be arranged with a first hole 182 flanked by a second hole 184a and a third hole 184b, with second hole 184a and third hole 184b disposed on opposing sides of first hole 182. Stated differently, first hole 182 may be positioned between second hole 184a and third hole 184b. Second hole 184a and third hole 184b may operate to shield first hole 182 from hoop stress in the circumferential direction 162.

In various embodiments, the holes of hole arrays 180 may be arranged linearly along a circumference of balance flange 120. In relation to the linear pattern of hole array 180, first hole 182 may be arranged as a central hole, second hole 184a and third hole 184b may be arranged as the outermost holes. Describing the arrangement of hole array 180 in relation to the provided xyz axis, the three (3) holes of hole array 180 may be arranged as follows in the positive y-direction: second hole 184a, first hole 182, third hole 184b. Second hole 184a may shield first hole 182 from stress in a first circumferential direction, and third hole 184b may shield first hole 182 from stress in a second circumferential direction, which is 180 degrees opposite to the first circumferential direction.

In various embodiments, hole 182 may have a round or circular shape. Although depicted as having circular geometry, hole 182 may have an oval, rectangular, slotted, triangular, polygonal, irregular or other shape. While first hole 182 may be round in shape, first hole 182 may also be described in relation to circumferential direction 162 as having a first side 182a and a second side 182b. Hole array 180 may be arranged with second hole 184a disposed on a first side 182a of first hole 182 and with third hole 184b disposed on a second side 182b of first hole 182, wherein first side 182a and second side 182b are opposing sides of first hole 182.

Second hole 184a and third hole 184b may be larger in size than first hole 182. In various embodiments, the second hole 184a and third hole 184b may be between 1.1 and 2 times the size of the first hole 182. In various embodiments, holes 184a, 184b may have an elongated or oval shape. Although depicted as having oval geometry, holes 184a, 184b may have a circular, rectangular, slotted, triangular, polygonal, irregular or other shape. Second hole 184a and third hole 184b may be symmetrical and may be substantially the same size. The arrangement of larger and elongated holes, second hole 184a and third hole 184b, positioned directly adjacent to first hole 182 may provide greater shielding of first hole 182 from hoop stress as compared to, for example, the directly adjacent holes being similarly sized to first hole 182. Second hole 184a and third hole 184b having an oval shaped may have a first dimension along a first axis, in the y direction, and having a second dimension along a second axis, in the z direction. The first dimension of second hole 184a and/or third hole 184b may be a width D6. In various embodiments, the width D6 of second hole 184a and third hole 184b may be between 1.3 and 1.6 times the width D1 of first hole 182. The second dimension of second hole 184a and/or third hole 184b may be a length D7. Length D7 may be greater than width D6, and may be for example, 1.2 to 1.5 times width D6. In various embodiments, the length D7 of second hole 184a and third hole 184b may be between 1.7 and 2 times the width D1 of first hole 182.

In various embodiments, a dimension or width D6 of second hole 184a and of third hole 184b may be nominally between 2.29 mm (0.090 inch) and 2.54 mm (0.100 inch). For example, width D6 may range from about 2.16 mm (0.085 inch) to 2.92 mm (0.115 inch), or may range from about 2.24 mm (0.088 inch) to 2.84 mm (0.112 inch), or more specifically, may range from about 2.29 mm (0.090 inch) to 2.54 mm (0.100 inch), wherein "about" in this context only means +/−0.03 mm (0.001 inch).

In various embodiments, a dimension or length D7 of second hole 184a and of third hole 184b may be nominally between 3.05 mm (0.120 inch) and 3.30 mm (0.130 inch). For example, length D7 may range from about 2.92 mm (0.115 inch) to 3.43 mm (0.135 inch), or may range from about 3.0 mm (0.118 inch) to 3.35 mm (0.132 inch), or more specifically, may range from about 3.05 mm (0.120 inch) to 3.30 mm (0.130 inch), wherein "about" in this context only means +/−0.03 mm (0.001 inch).

With reference to FIG. 5B, a circumferential cross-sectional view taken along line 5B-5B of FIG. 5A of a hole array 180 in a balance flange 120 is shown, in accordance with various embodiments. In various embodiments, an angle δ of a center line of second hole 184a relative to a centerline of first hole 182 may be between 1.0 and 3.5 degrees, or between 1.5 and 3.0 degrees. Third hole 184b may be similarly spaced from first hole 182 by angle δ in a direction opposite to second hole 184a. The portions of balance flange 120 disposed between the holes in a hole array 180 may be described as a web 190, and the distance between holes within a hole array 180 may be described as a web distance 192. Within a hole array 180, a distance between each hole relative to the size of the hole may be described as a ratio of web distance 192 to the diameter or width of a hole. For example, a web distance to width ratio may be between 0.5:1 and 1.5:1. Stated differently, a web distance 192 between first hole 182 and second hole 184a may be between 0.5 to 1.5 times at least one of the width D1 of first hole 182 or the width D6 of second hole 184a. Similarly, a web distance 192 between first hole 182 and third hole 184b may be between 0.5 to 1.5 times at least one of the width D1 of first hole 182 or the width D6 of third hole 184b.

Figure 6A:
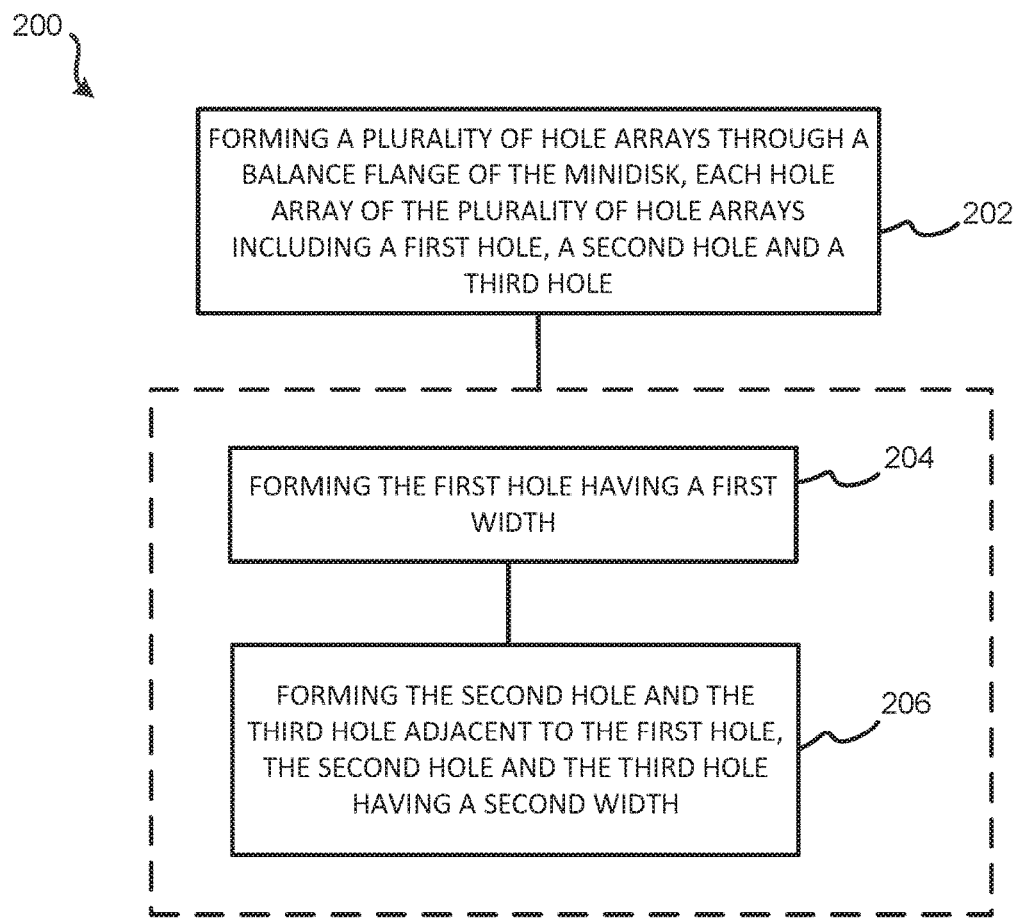
FIGS. 6A and 6B illustrate methods for manufacturing a minidisk for a rotor system, in accordance with various embodiments.

With reference to FIG. 6A, a method 200 for manufacturing a minidisk for a rotor system is shown, in accordance with various embodiments. Method 200 may comprise the step of forming a plurality of hole arrays through a balance flange of the minidisk (step 202). Each hole array of the plurality of hole arrays may include a first hole 182, a second hole 184a and a third hole 184b. The step of forming the plurality of hole arrays may comprise forming the first hole having a first width (step 204). The first hole 182 may be configured to receive a balance weight. The step of forming the plurality of hole arrays may further comprise forming the second hole 184a and the third hole 184b adjacent to the first hole 182 (step 206). The second hole 184a and the third hole 184b may have a second width. The second width D6 may be greater than the first width D1. Step 204 may further comprise forming the first hole 182 between the second hole 184a and the third hole 184b. A distance between the first hole 182 and the second hole 184a may be between 0.5 to 1.5 times at least one of the first width D1 or the second width D6. Hole 182 may have a round or circular shape, and holes 184a, 184b may have an elongated or oval shape. In various embodiments, hole arrays 180 may include not more than two hole sizes in order to simplify the manufacturing process for hole arrays 180. Hole arrays 180 may be manufactured by subtractive techniques, drilling, milling, machining or other suitable process.

Figure 6B:
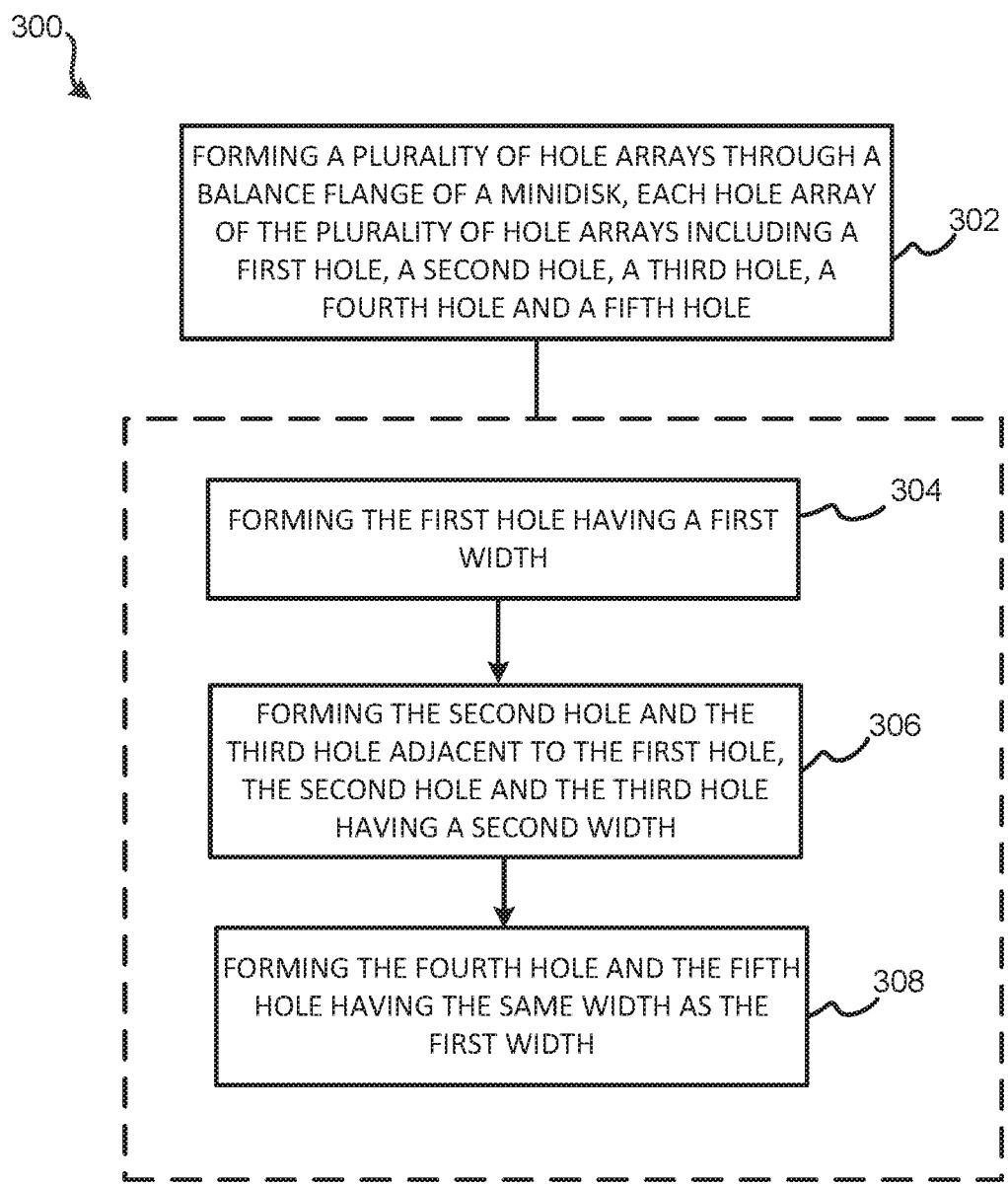

With reference to FIG. 6B, a method 300 for manufacturing a minidisk for a rotor system is shown, in accordance with various embodiments. Method 300 may comprise the step of forming a plurality of hole arrays through a balance flange of the minidisk (step 302). Each hole array of the plurality of hole arrays may include a first hole, a second hole, a third hole, a fourth hole and a fifth hole. The step of forming the plurality of hole arrays may comprise forming the first hole having a first width (step 304). The first hole 152 may be configured to receive a balance weight. The step of forming the plurality of hole arrays may further comprise forming the second hole 154a and the third hole 154b adjacent to the first hole 152. The second hole 154a and the third hole 154b may have a second width. The second width may be greater than the first width. The step of forming the plurality of hole arrays may further comprise forming the fourth hole and the fifth hole having the same width as the first width (step 306). Step 306 may further comprise forming the second hole between the first hole and the fourth hole, and forming the third hole between the first hole and the fifth hole. In various embodiments, hole arrays 150 may include not more than two hole sizes in order to simplify the manufacturing process for hole arrays 150. Hole arrays 150 may be manufactured by subtractive techniques, drilling, milling, machining or other suitable process. Each of holes 152, 154a, 154b, 156a and 156b may have a round or circular shape.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A minidisk for a rotor system, comprising:
   a body having an annular shape and an axial surface; and
   a balance flange extending axially from the axial surface, the balance flange defining a plurality of hole arrays, each hole array in the plurality of hole arrays comprising:
      a first hole having a first width, the first hole configured to receive a balance weight, and
      a second hole having a second width being greater than the first width and a third hole having the same width as the second width, the second hole and the third hole disposed immediately adjacent to the first hole;

a fourth hole having a fourth width, the fourth hole disposed immediately adjacent to the second hole and opposite to the first hole, wherein the fourth width is the same as the first width; and a fifth hole having a fifth width, the fifth hole disposed immediately adjacent to the third hole and opposite to the first hole, wherein the fifth width is the same as the first width, wherein a first circumferential distance between immediately adjacent hole arrays is greater than a second circumferential distance between the first hole and the second hole.

2. The minidisk of claim 1, wherein the first hole, the second hole and the third hole are arranged linearly along a circumference of the minidisk, and wherein the first hole is disposed between the second hole and the third hole.

3. The minidisk of claim 1, wherein the second width is between 1.1 and 1.3 times the first width.

4. The minidisk of claim 1, wherein a distance between the first hole and the second hole is between 0.5 to 1.5 times at least one of the first width or the second width.

5. The minidisk of claim 1, wherein the first hole, the second hole, the third hole, the fourth hole and the fifth hole each have a circular shape.

6. The minidisk of claim 1, wherein the balance flange extends axially from the minidisk and a centerline of the first hole extends radially through the balance flange.

7. A gas turbine engine, comprising:
a turbine section including a rotor assembly, the rotor assembly comprising:
a disk, and
a minidisk coupled to the disk, the minidisk having a balance flange defining a plurality of hole arrays, each hole array in the plurality of hole arrays comprising:
a first hole having a first width, the first hole configured to receive a balance weight,
a second hole disposed immediately adjacent to the first hole and having a second width, wherein the second width is greater than the first width, and
a third hole disposed immediately adjacent to the first hole and having a third width, which is the same as the second width, wherein the first hole is disposed between the second hole and the third hole;
a fourth hole disposed immediately adjacent to the second hole and having a fourth width, which is the same as the first width, and
a fifth hole having a fifth width, which is the same as the first width, wherein the third hole is disposed between the first hole and the fifth hole,
wherein a first circumferential distance between immediately adjacent hole arrays is greater than a second circumferential distance between the first hole and the second hole.

8. The gas turbine engine of claim 7, wherein the first hole, the second hole and the third hole are arranged linearly along a circumference of the minidisk.

9. The gas turbine engine of claim 7, wherein the balance flange extends axially from the minidisk and a centerline of the first hole extends radially through the balance flange.

10. The gas turbine engine of claim 7, wherein the second width is between 1.1 and 1.3 times the first width.

11. The gas turbine engine of claim 7, wherein a distance between the first hole and the second hole is between 0.5 to 1.5 times at least one of the first width or the second width.

12. The gas turbine engine of claim 7, wherein the first hole, the second hole, the third hole, the fourth hole and the fifth hole each have a circular shape.

13. The gas turbine engine of claim 7, wherein at least one of the fourth hole or the fifth hole is configured to receive the balance weight.

14. A minidisk for a rotor system, comprising:
a body having an annular shape and an axial surface; and
a balance flange extending axially from the axial surface, the balance flange defining a plurality of hole arrays, each hole array in the plurality of hole arrays comprising:
a first hole having a first width, the first hole configured to receive a balance weight,
a second hole having a second width being greater than the first width and a third hole having the same width as the second width, the second hole and the third hole disposed immediately adjacent to the first hole; and
a fourth hole and a fifth hole having the same width as the first width, the second hole disposed between the first hole and the fourth hole, and the third hole disposed between the first hole and the fifth hole,
wherein a first circumferential distance between immediately adjacent hole arrays is greater than a second circumferential distance between the first hole and the second hole.

15. The minidisk of claim 14, wherein a distance between the first hole and the second hole is between 0.5 to 1.5 times at least one of the first width or the second width.

16. The minidisk of claim 14, wherein at least one of the third hole or the fifth hole is configured to receive the balance weight.

17. The minidisk of claim 14, wherein the first hole, the second hole, the third hole, the fourth hole and the fifth hole each have a circular shape.

18. The minidisk of claim 14, wherein the balance flange extends axially from the minidisk and a centerline of the first hole extends radially through the balance flange.

* * * * *